(No Model.)
W. P. KOOKOGEY.
ELECTRODE FOR SECONDARY BATTERIES.
No. 409,106.  Patented Aug. 13, 1889.
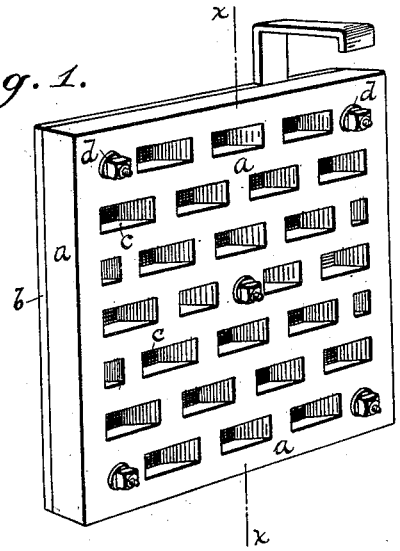
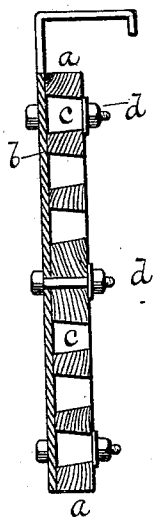
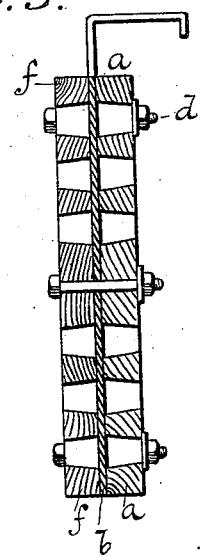
WITNESSES:
Walter S. Logan
George C. Brainerd
INVENTOR:
William Prescott Kookogey
BY Salter S. Clark
his ATTORNEYS.

UNITED STATES PATENT OFFICE.

WILLIAM PRESCOTT KOOKOGEY, OF BROOKLYN, ASSIGNOR TO THE KOOKOGEY ELECTRIC COMPANY, OF NEW YORK, N. Y.

ELECTRODE FOR SECONDARY BATTERIES.

SPECIFICATION forming part of Letters Patent No. 409,106, dated August 13, 1889.

Application filed December 26, 1888. Serial No. 294,683. (No model.)

*To all whom it may concern:*

Be it known that I, WILLIAM PRESCOTT KOOKOGEY, of the city of Brooklyn, in the county of Kings and State of New York, United States of America, have invented a new and useful Plate for Secondary Batteries, of which the following is a specification.

My invention relates to the plates in a secondary or storage electrical battery; and it consists of a plate made upon a principle differing from any heretofore known.

My invention consists, in general, of the combination of a supporting-plate of some solid material which is not destructively acted upon by the acid of the battery, and which has a low difference of potential with lead—such as wood—such plate being pierced with openings, into which the active material or the material intended to be made active is placed, the two plates being held tightly together. The objects attained by it are that it lasts very much longer than any plate heretofore known and more efficiently, owing to its completely avoiding or greatly diminishing the common faults which lead to the destruction of the ordinary plate—such as buckling, scaling, disintegration, reduction of the solid frame of the plate, &c.—and that it is very much lighter and cheaper, owing to the material used and the ease of manufacture.

In the specification the term "active material" is used to signify the plastic material held by either the positive or negative plate or electrode, being (after reduction) peroxide of lead in one of the plates and spongy lead in the other. The "positive" plate herein signifies the active plate—that is, the one holding the peroxide of lead—and the "negative" plate being the one holding the spongy lead.

At the commencement of the art the storage-battery plates consisted of metallic lead simply, the active material being formed on their surface by the action of a charging-current. The first improvement upon these consisted of spreading plastic layers of oxide of lead and litharge, respectively, upon the two lead plates, by which the "forming" of the battery was accomplished more quickly and a deeper layer of active material obtained. The chief difficulty with such plates lies in the difficulty of keeping the active material (especially in the positive plate) upon them. The numerous devices to accomplish this heretofore known fall into two classes: (*a*) the first class, consisting of some change of form in the supporting-plates—such as to roughen their surface with acid or mechanically, casting them in the form of a grid, in the perforations of which the active material is placed under pressure, or casting them with inclined pockets in which the active material lies; (*b*) the second class, consisting of the addition of a cover of some part to hold the layer of the active material against the plate by mechanical pressure—such as a porous cover of tough cloth, or a perforated cover of non-conducting, non-corrosive, and non-flexible material—such as ebonite. Some of these devices may have been more or less improvements; but the main difficulty still remains in large measure. The active material on the two plates must have a certain exposure to the electrolyte, and the plates must be placed very near together in order to produce a practical cell. The active material (especially on the positive plate) still tends to swell and fall away from the lead-supporting plate, causing not only its own loss, but the exposure of more of the lead-supporting plate to the electrolyte, and so leading to the gradual destruction of the plate and often causing short-circuiting between the plates. The plate bends or buckles, owing to its character—lead—which buckles under the action of the electric current; and there still remains the tendency of the lead of the plate to be formed into active material, thus again leading to the destruction of the plate. If the lead-supporting plate is made heavy enough, so that it cannot buckle and will not under the ordinary action of the battery be injured by reduction of the metallic lead, it then becomes too heavy and too costly for practical use. If the insulating-cover placed over the layer of active material to keep it on is made close and thick enough to accomplish that object and to prevent buckling, it seriously increases the internal resistance of the battery by separating the plates and also decreases the efficiency by retarding the circulation of the electrolyte.

The invention herein described differs in principle from all that has preceded it. The essential feature of a storage-battery is that the active material—a more or less plastic substance—must be supported by some solid, and must be held in close contact with the conductor leading to the terminal and must also be free to the electrolyte. In all prior inventions this active material has been supported by the conducting-plate itself. This has been accomplished by means of the molecular attraction, as in the Planté plate, or by means of its own adhesive power solely, or by its adhesive power, with the help of projections from the conducting-plate, or with the help of a cover of some sort fastening it to the plate, or by its being placed actually within the perforations in the plate, or by the combination of two or more of these agencies. In this invention, however, the conductor is in no way a support. The active material is supported entirely by an additional plate, which is made of a material not injuriously affected by the acid or the action of the battery, and the conducting-plate is used simply as a conductor.

In the accompanying drawings, in which the same letters indicate the same parts, Figure 1 is a perspective view of a battery-plate made according to the invention. Fig. 2 is a perpendicular sectional view of the same on the line $x\,x$ of Fig. 1. Fig. 3 is a sectional view with two similar supporting-plates, one on each side of the conducting-plate.

The supporting-plate $a$ consists of some material not injuriously acted upon by the acid, and having a low conducting quality. It has slots or other shaped openings $c$ cut entirely through it. In these the active material is designed to lie in contact with a thin plate of lead or other conducting material $b$, the two plates $a$ and $b$ being bolted together by the bolts $d$, or held in contact in any other appropriate method. The thickness of the plate $a$ may be an inch or any other thickness suitable to the special use to which the battery is to be put, and sufficient to prevent buckling of the plate $b$, and the lead plate $b$ may be quite thin—say, one-eighth of an inch or less, depending upon circumstances. In Fig. 3 the plate $f$ is a perforated plate, exactly similar to the supporting-plate $a$ placed upon the other side of the conducting-plate $b$, and also designed to hold active material. The openings of the two plates $a$ and $f$ may or may not be opposite each other.

Any material may be used for the supporting-plates $a$ and $f$ which is not corroded or injuriously acted upon by the acid of the battery, and which has no difference of potential, or a very low difference of potential, with the conducting-plate $b$, such as hard rubber, ebonite, glass, &c. The conducting-plate $b$ is preferably made of lead. The active material may be placed in the openings $c$ without the use of pressure and without skilled labor. If the openings $c$ are made to present a larger surface to the lead plate $b$ than on the outside, it will tend to keep the active material in good contact with the plate $b$.

Scaling and disintegration are greatly lessened, if not entirely prevented, by this invention, inasmuch as the same quantity of active material may be used as in the prior forms, with a greatly less surface area exposed to the liquid. Buckling is entirely overcome by the thickness of the supporting-plates $a$ and $f$, and there is no danger from reduction of the plate $b$. The lead of the plate $b$, which comes opposite to the wood of the plate $a$, is entirely protected from reduction, and enough of it will therefore always remain to serve the purpose of a conductor. The plate, therefore, practically is indestructible. With these advantages there is another important one, that all the active material in the supporting-plates $a$ and $f$ is available, and it may all be entirely reduced without injury to the structure of the plate, while in prior forms only a certain small percentage can be reduced with safety. The result is that for the same amount of active material this plate is many times as efficient as prior ones. In a battery there is a great saving in weight, owing to the comparatively small quantity of lead needed in the conducting-plate. The space occupied for a given capacity is about the same. In addition to these general advantages, there are other special advantages in the use of wood rather than glass, ebonite, &c., for the supporting-plate $a$. They are: it is light, cheap, and easy to manufacture; when saturated with the liquid of the battery it has a certain low conductivity; and it has a certain elasticity, thus allowing the blocks of active material in the perforations $c$ to swell slightly, as they do under the action of the battery, without falling out. The swelling will merely keep them in better. The best kind of wood, so far as I know now, for this purpose is ash. If treated with hot paraffine, it will not warp in the liquid of the battery.

The principle of the invention is applicable to the negative as well as the positive plate, but with greater advantages in the case of the positive plate. The form of the plate and its perforations may also be varied.

I claim as my invention—

1. In a secondary electric cell, as one of the elements or electrodes thereof, the combination of active material, a supporting-plate therefor having perforations to contain and support the active material, which supporting-plate consists of a substance not injuriously acted upon by the liquid, and has a low difference of potential with lead, and a conductor leading to the terminal of the cell and held in contact with the active material, substantially as and for the purpose described.

2. A plate for a storage-battery, consisting of the combination of a supporting-plate having perforations in which the active material is contained and supported, such plate being of a material which is not injuriously acted upon by the liquid and has a low difference of potential with lead, and a thin plate of lead fastened to the supporting-plate, substantially as and for the purpose described.

3. A plate for a storage-battery, consisting of a supporting-plate of wood, having perforations in which the active material is contained and supported, and a conducting-plate of lead fastened to such supporting-plate, substantially as and for the purpose described.

4. A plate for a storage-battery, consisting of a wooden plate $a$, having perforations $c$ to contain and support the active material, and a thin lead plate $b$ bolted thereto, substantially as and for the purpose described.

In witness whereof I have hereunto signed my name, in the presence of two witnesses, this 22d day of December, 1888.

WILLIAM PRESCOTT KOOKOGEY.

Witnesses:
WALTER S. LOGAN,
SALTER STORRS CLARK.